US012204275B2

(12) United States Patent
Shimizu et al.

(10) Patent No.: US 12,204,275 B2
(45) Date of Patent: Jan. 21, 2025

(54) DEVELOPING CARTRIDGE PROVIDING LAYOUT OF ELECTRODES AND DETECTION GEAR

(71) Applicant: BROTHER KOGYO KABUSHIKI KAISHA, Nagoya (JP)

(72) Inventors: Keita Shimizu, Nagoya (JP); Tomoya Ichikawa, Nagoya (JP); Takashi Shimizu, Nagoya (JP); Kazuna Taguchi, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/486,004

(22) Filed: Oct. 12, 2023

(65) Prior Publication Data

US 2024/0045371 A1 Feb. 8, 2024

Related U.S. Application Data

(63) Continuation of application No. 18/173,136, filed on Feb. 23, 2023, now Pat. No. 11,803,154, which is a (Continued)

(30) Foreign Application Priority Data

Jul. 15, 2016 (JP) ................................ 2016-140410

(51) Int. Cl.

*G03G 21/18* (2006.01)
*G03G 15/08* (2006.01)
*G03G 21/16* (2006.01)

(52) U.S. Cl.

CPC ..... *G03G 21/1867* (2013.01); *G03G 15/0868* (2013.01); *G03G 21/1652* (2013.01);

(Continued)

(58) Field of Classification Search

CPC ........... G03G 21/1867; G03G 15/0868; G03G 21/1896; G03G 21/1652; G03G 21/1857; G03G 2221/166

See application file for complete search history.

(56) References Cited

U.S. PATENT DOCUMENTS 10,241,467 B2 3/2019 Shimizu et al.
10,379,492 B2 8/2019 Shimizu et al.

(Continued)

FOREIGN PATENT DOCUMENTS

CN 1828446 A 9/2006
CN 102109792 A 6/2011

(Continued)

OTHER PUBLICATIONS

Office Action issued in related European Patent Application No. 17 164 054.3, Nov. 5, 2018.

(Continued)

*Primary Examiner* — Ryan D Walsh
(74) *Attorney, Agent, or Firm* — Merchant & Gould P.C.

(57) ABSTRACT

A developing cartridge includes a developing electrode and a supply electrode. The developing electrode includes a first electrical contact in contact with a developing roller shaft, and a second electrical contact positioned closer to the developing roller shaft than a second agitator gear is to the developing roller shaft. The second electrical contact is positioned farther from the developing roller shaft than the first electrical contact is from the developing roller shaft. The supply electrode includes a first electrical contact in contact with the supply roller shaft, and a second electrical contact positioned closer to the developing roller shaft than the second agitator gear is to the developing roller shaft. The second electrical contact of the supply electrode is positioned farther from the developing roller shaft than the (Continued)

second electrical contact of the developing electrode is from the developing roller shaft.

12 Claims, 10 Drawing Sheets

Related U.S. Application Data continuation of application No. 17/869,843, filed on Jul. 21, 2022, now Pat. No. 11,604,433, which is a continuation of application No. 16/989,633, filed on Aug. 10, 2020, now Pat. No. 11,415,933, which is a continuation of application No. 16/534,803, filed on Aug. 7, 2019, now Pat. No. 10,747,173, which is a continuation of application No. 16/284,372, filed on Feb. 25, 2019, now Pat. No. 10,379,492, which is a continuation of application No. 15/957,342, filed on Apr. 19, 2018, now Pat. No. 10,241,467, which is a continuation of application No. 15/473,123, filed on Mar. 29, 2017, now Pat. No. 9,964,922.

(52) U.S. Cl.
CPC ..... *G03G 21/1857* (2013.01); *G03G 21/1896* (2013.01); *G03G 2221/166* (2013.01)

(56) References Cited

U.S. PATENT DOCUMENTS

| | | | | |
|---|---|---|---|---|
| 11,067,919 | B2 | 7/2021 | Itabashi et al. | |
| 11,415,933 | B2 | 3/2022 | Shimizu et al. | |
| 11,675,289 | B2 | 6/2023 | Itabashi et al. | |
| 11,803,154 | B2 * | 10/2023 | Shimizu | G03G 21/1857 |
| 11,874,628 | B2 * | 1/2024 | Ao | G03G 21/1647 |
| 12,092,992 | B2 * | 9/2024 | Itabashi | G03G 21/1896 |
| 2006/0029418 | A1 | 2/2006 | Ishii et al. | |
| 2007/0009282 | A1 | 1/2007 | Sato et al. | |
| 2007/0140725 | A1 | 6/2007 | Kamimura | |
| 2011/0158685 | A1 | 6/2011 | Takagi et al. | |
| 2011/0236062 | A1 | 9/2011 | Takagi | |
| 2011/0236064 | A1 | 9/2011 | Fujii | |
| 2013/0051816 | A1 | 2/2013 | Itabashi | |
| 2013/0051833 | A1 | 2/2013 | Itabashi et al. | |
| 2013/0084081 | A1 | 4/2013 | Itabashi et al. | |
| 2013/0084083 | A1 | 4/2013 | Itabashi et al. | |
| 2014/0086613 | A1 | 3/2014 | Itabashi et al. | |
| 2015/0117873 | A1 | 4/2015 | Mori et al. | |
| 2015/0117905 | A1 | 4/2015 | Shimizu | |
| 2015/0117906 | A1 | 4/2015 | Mori | |
| 2015/0125175 | A1 | 5/2015 | Fujii | |
| 2015/0192878 | A1 | 7/2015 | Iriyama et al. | |
| 2017/0185032 | A1 * | 6/2017 | Itabashi | G03G 21/1652 |
| 2017/0269542 | A1 * | 9/2017 | Itabashi | G03G 21/1867 |
| 2018/0088524 | A1 | 3/2018 | Ozawa | |
| 2018/0095412 | A1 | 4/2018 | Shimizu et al. | |
| 2018/0284688 | A1 | 10/2018 | Shimizu | |
| 2018/0284689 | A1 | 10/2018 | Shimizu | |
| 2019/0294101 | A1 | 9/2019 | Shimizu et al. | |
| 2023/0359137 | A1 * | 11/2023 | Minoshima | G03G 21/1839 |

FOREIGN PATENT DOCUMENTS

| | | | |
|---|---|---|---|
| CN | 102200725 | A | 9/2011 |
| CN | 104471490 | A | 3/2015 |
| CN | 104730881 | A | 6/2015 |
| EP | 1 696 284 | A2 | 8/2006 |
| EP | 2 343 606 | A1 | 7/2011 |
| EP | 2 574 992 | A2 | 4/2013 |
| JP | 2011-203362 | A | 10/2011 |
| JP | 2013-054056 | A | 3/2013 |
| JP | 2013-73214 | A | 4/2013 |
| JP | 2014-63071 | A | 4/2014 |
| JP | 2015-146016 | A | 8/2015 |

OTHER PUBLICATIONS

Extended European Search Report issued in corresponding European Patent Application No. 19208534.8, Feb. 28, 2020.
Notification of First Office Action issued in corresponding Chinese Patent Application No. 201710395711.7, Dec. 14, 2020.
Office Action issued in corresponding European Patent Application No. 19208534.8, mailed Mar. 22, 2022.

* cited by examiner

DEVELOPING CARTRIDGE PROVIDING LAYOUT OF ELECTRODES AND DETECTION GEAR

CROSS REFERENCE TO RELATED APPLICATION

This application is a continuation of U.S. patent application Ser. No. 18/173,136, filed Feb. 23, 2023, now U.S. Pat. No. 11,803,154, which is a continuation of U.S. patent application Ser. No. 17/869,843, filed Jul. 21, 2022, now U.S. Pat. No. 11,604,433, which is a continuation of U.S. patent application Ser. No. 16/989,633, filed Aug. 10, 2020, now U.S. Pat. No. 11,415,933, which is a continuation of U.S. patent application Ser. No. 16/534,803, filed Aug. 7, 2019, now U.S. Pat. No. 10,747,173, which is a continuation of U.S. patent application Ser. No. 16/284,372, filed Feb. 25, 2019, now U.S. Pat. No. 10,379,492, which is a continuation of U.S. patent application Ser. No. 15/957,342, filed Apr. 19, 2018, now U.S. Pat. No. 10,241,467, which is a continuation of U.S. patent application Ser. No. 15/473,123, filed Mar. 29, 2017, now U.S. Pat. No. 9,964,922, which further claims priority from Japanese Patent Application No. 2016-140410 filed Jul. 15, 2016. The entire contents of these applications are incorporated herein by reference.

TECHNICAL FIELD

The present disclosure relates to a developing cartridge for use in an image forming apparatus.

BACKGROUND

Among image forming apparatuses provided with developing cartridges, there is known an image forming apparatus capable of determining whether a developing cartridge is attached to the apparatus or capable of identifying specifications of the developing cartridge. For example, prior art discloses an image forming apparatus includes a sensor for detecting a protrusion of a detection gear provided at a developing cartridge, and the image forming apparatus determines whether the developing cartridge is attached to the image forming apparatus or not.

Further, prior art also discloses an image-forming device including a developing electrode and a supply electrode. The developing electrode is a bearing for the developing roller, and the supply electrode is a bearing for the supply roller. The developing electrode and supply electrode contact corresponding electrodes in the image-forming device in the axial direction of the developing roller.

Further, prior art also discloses an image-forming apparatus including a detection gear and a developing electrode. The detection gear and the developing electrode are positioned at a same side in an axial direction of a developing roller.

SUMMARY

When the developing cartridge requires both a developing electrode and a supply electrode as in prior art, it is desirable to arrange the detection gear and developing electrode at the same side of the developing cartridge in the axial direction in order to make the developing cartridge as compact as possible. However, when the developing cartridge is attached to and detached from the image-forming apparatus, the protrusion on the detection gear may scrape against electrical contacts on the developing electrodes provided at the image-forming apparatus, or the developing electrode and/or supply electrode may scrape against a sensor at the image-forming apparatus provided for detecting the detection gear, depending on the layout of the developing electrode, supply electrode, and detection gear at the developing cartridge.

In view of the foregoing, it is an object of the disclosure to provide a developing cartridge configured to prevent the developing electrode, supply electrode, and detection gear from unnecessarily scraping against components in the image-forming apparatus when the cartridge is attached to and detached from the image-forming apparatus.

This and other objects will be attained by providing a developing cartridge including: a developing roller, a casing, a supply roller, a coupling, a developing gear, a supply gear, an agitator, a first agitator gear, a second agitator gear, a developing electrode, a supply electrode, a detection gear, and a first protrusion. The developing roller includes a developing roller shaft extending in a first direction. The developing roller is rotatable about the developing roller shaft. The casing is configured to accommodate therein developing agent. The casing includes a first frame and a second frame facing the first frame in a second direction crossing the first direction. The developing roller is positioned at one end portion of the casing in a third direction crossing the first direction and the second direction. The supply roller includes a supply roller shaft extending in the first direction. The supply roller is rotatable about the supply roller shaft. The coupling is rotatable about a first axis extending in the first direction. The coupling is positioned at one end of the casing in the first direction. The developing gear is mounted to the developing roller shaft. The developing gear is rotatable together with the coupling. The developing gear is positioned at the one end of the casing in the first direction. The supply gear is mounted to the supply roller shaft. The supply gear is rotatable together with the coupling. The supply gear is positioned at the one end of the casing in the first direction. The agitator is rotatable together with the coupling about a second axis extending in the first direction. The agitator is configured to agitate the developing agent. The first agitator gear is positioned at the one end of the casing in the first direction. The first agitator gear is mounted to the agitator. The first agitator gear is rotatable together with the agitator in accordance with the rotation of the coupling. The second agitator gear is mounted to the agitator. The second agitator gear is rotatable together with the agitator. The second agitator gear is positioned at another end of the casing in the first direction. The developing electrode is positioned at the other end of the casing in the first direction. The developing electrode is configured to supply electric power to the developing roller shaft. The developing electrode includes: a first electrical contact, and a second electrical contact. The first electrical contact is in contact with the developing roller shaft. The second electrical contact is positioned closer to the developing roller shaft than the second agitator gear is to the developing roller shaft in the third direction. The second electrical contact is positioned farther from the developing roller shaft than the first electrical contact is from the developing roller shaft in the second direction and the third direction. The supply electrode is positioned at the other end of the casing in the first direction. The supply electrode is configured to supply electric power to the supply roller shaft. The supply electrode includes: a first electrical contact, and a second electrical contact. The first electrical contact is in contact with the supply roller shaft. The second electrical contact is positioned closer to the developing roller shaft than the second agitator gear is to the developing roller shaft in the third direction. The second electrical contact of the supply electrode is positioned farther from the developing roller shaft than the second electrical contact of the developing electrode is from the developing roller shaft in the second direction and the third direction. The detection gear is configured to engage with the second agitator gear. The detection gear is rotatable together with the second agitator gear from a first position to a second position. The detection gear is positioned at the other end of the casing in the first direction. The detection gear is positioned farther from the developing roller shaft than the second electrical contact of the supply electrode is from the developing roller shaft in the third direction. The first protrusion is movable together with the detection gear. A distal end of the first protrusion is positioned farther from the developing roller shaft than the second electrical contact of the supply electrode is from the developing roller shaft in the second direction and the third direction in a state where the detection gear is at the first position.

BRIEF DESCRIPTION OF THE DRAWINGS

The particular features and advantages of the disclosure will become apparent from the following description taken in connection with the accompanying drawings, in which:

FIG. 8(*b*) is a view illustrating the first position of the detection gear in the developing cartridge according to the embodiment, when viewed from an inside of the gear cover;

FIG. 9(*b*) is a view illustrating the actuator in contact with the third protrusion in the developing cartridge according to the embodiment;

FIG. 9(*c*) is a view illustrating the actuator positioned between the third protrusion and the second protrusion in the developing cartridge according to the embodiment;

FIG. 10 (*b*) is a view illustrating the second position of the detection gear in the developing cartridge according to the embodiment, when viewed from the inside of the gear cover.

DETAILED DESCRIPTION

A developing cartridge according to one embodiment will be described with reference to FIGS. 1 through 10(*b*).

Figure 1:
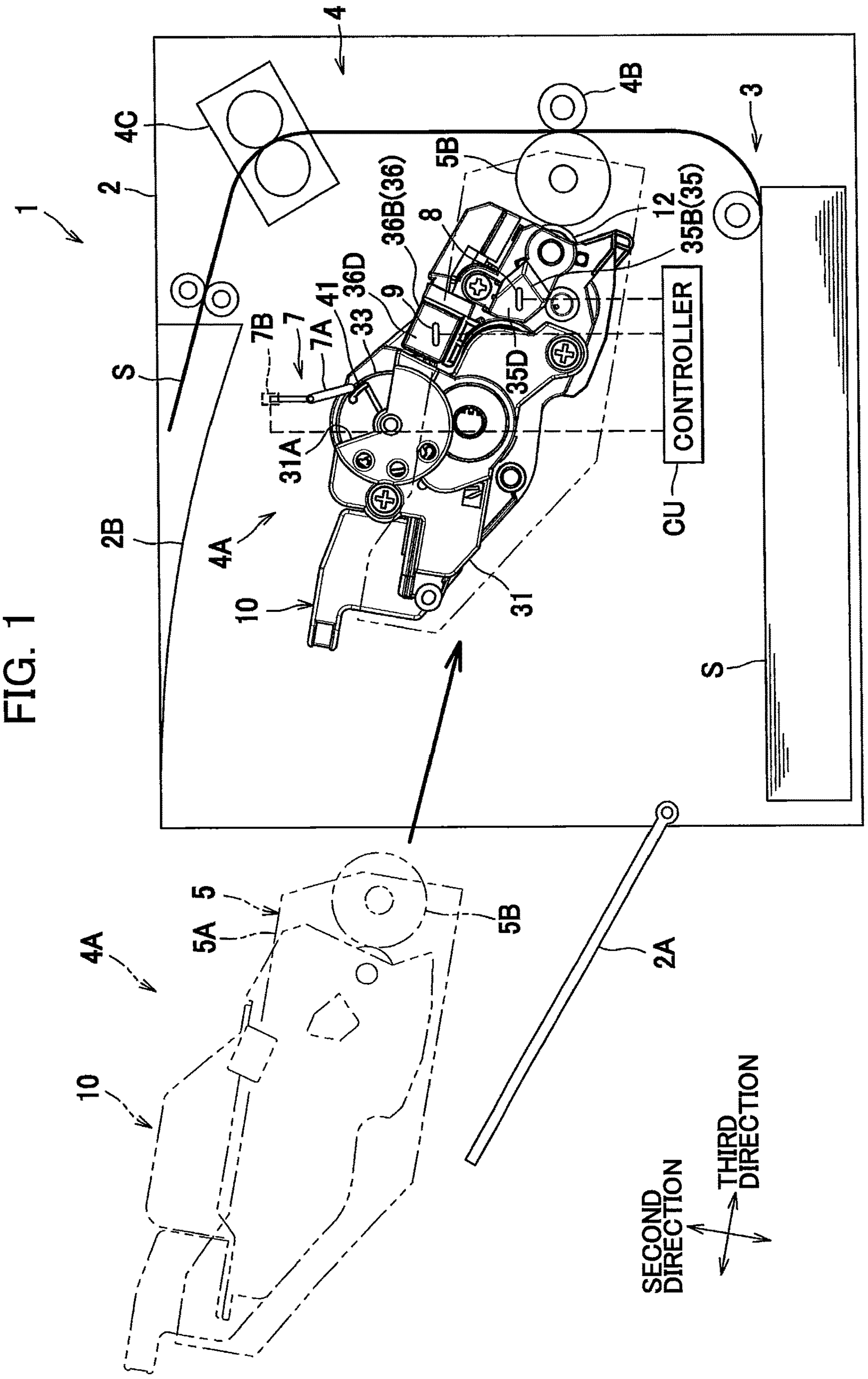
FIG. 1 is a cross-sectional view of a printer provided with a developing cartridge according to one embodiment.

FIG. 1 illustrates a laser printer 1 as an example of the image forming apparatus. The laser printer 1 primarily includes a housing 2, a sheet-feeding unit 3, an image-forming unit 4, and a control unit CU.

The housing 2 has a front cover 2A, and a discharge tray 2B positioned at a top of the housing 2. The sheet-feeding unit 3 and image-forming unit 4 are disposed in the housing 2. By opening the front cover 2A, a developing cartridge 10 described later can be detached from and attached to the housing 2.

The sheet-feeding unit 3 accommodates sheets S. The sheet-feeding unit 3 is configured to feed one sheet at a time to the image-forming unit 4.

The image-forming unit 4 includes a process cartridge 4A, an exposure unit (not illustrated), a transfer roller 4B, and a fixing unit 4C.

The process cartridge 4A includes a drum cartridge 5, and the developing cartridge 10. The developing cartridge 10 is detachably attached to the drum cartridge 5. In a state where the developing cartridge 10 is attached to the drum cartridge 5, the developing cartridge 10 and drum cartridge 5 can be detachably attached to the laser printer 1 as the process cartridge 4A. The drum cartridge 5 includes a frame 5A, and a photosensitive drum 5B rotatably supported to the frame 5A.

Figure 2:
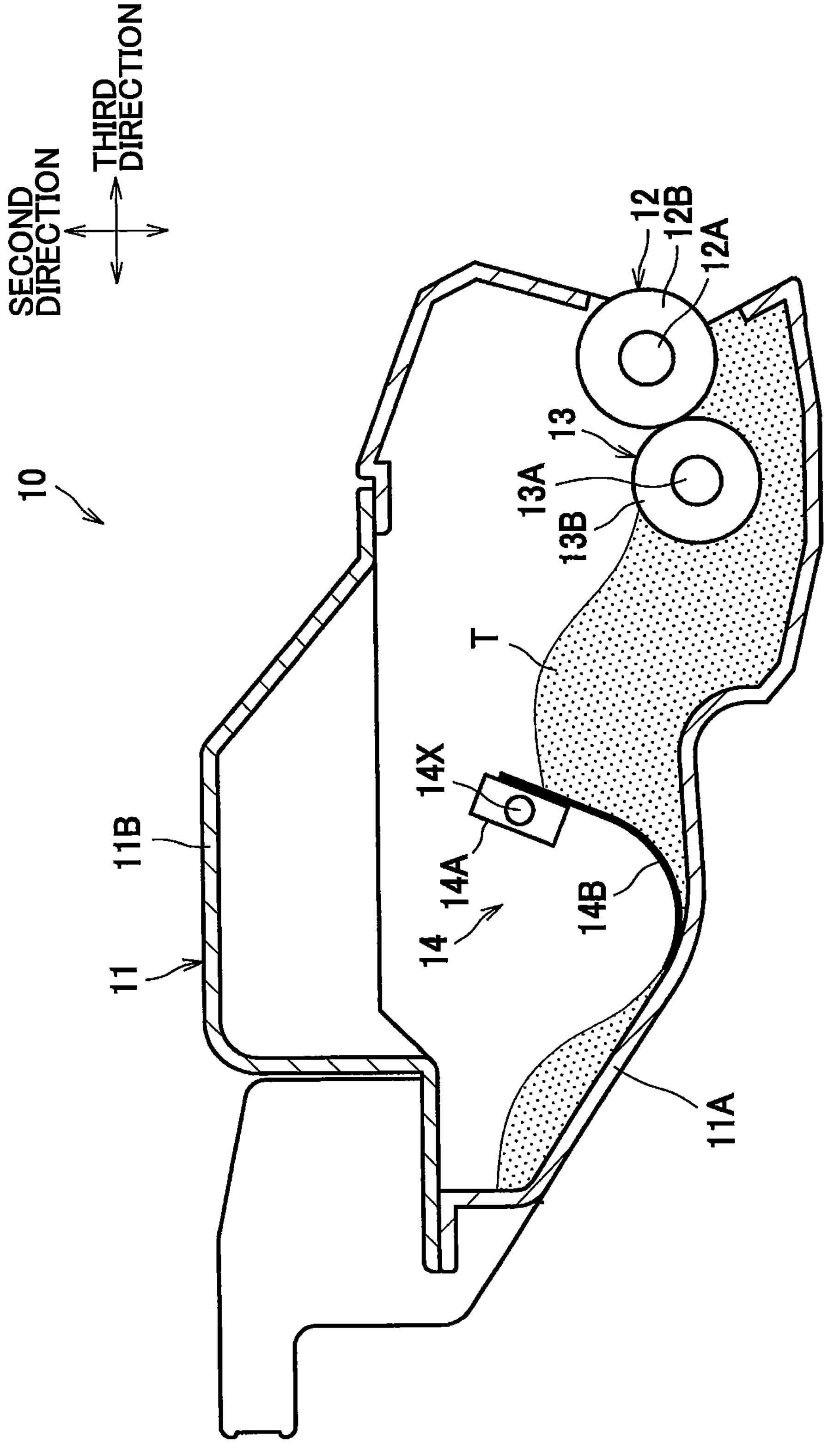
FIG. 2 is a cross-sectional view of a casing of the developing cartridge according to the embodiment.

As illustrated in FIG. 2, the developing cartridge 10 includes a casing 11, a developing roller 12, a supply roller 13, and an agitator 14.

The casing 11 includes a container 11A as an example of a second frame, and a lid 11B as an example of a first frame. The container 11A of the casing 11 is configured to accommodate toner T. The toner T is an example of the developing agent.

The developing roller 12 includes a developing-roller shaft 12A extending in a first direction, and a roller part 12B. The roller part 12B covers an outer circumferential surface of the developing-roller shaft 12A. The roller part 12B is formed of an electrically conductive rubber or the like. The developing roller 12 is rotatable about an axis of the developing-roller shaft 12A. Put another way, the developing roller 12 is supported in the casing 11 so as to be rotatable about the axis of the developing-roller shaft 12A. Hence, the roller part 12B can rotate together with the developing-roller shaft 12A. The control unit CU is configured to apply developing bias to the developing roller 12.

The container 11A and the lid 11B of the casing 11 face each other in a second direction. The second direction crosses the first direction, and preferably is orthogonal to the first direction. The developing roller 12 is positioned at one side of the casing 11 in a third direction (hereinafter called a "first side"). The third direction crosses both the first and second directions, and is preferably orthogonal to both the first and second directions.

The supply roller 13 includes a supply-roller shaft 13A extending in the first direction, and a roller part 13B. The roller part 13B covers an outer circumferential surface of the supply-roller shaft 13A. The roller part 13B is formed of a sponge material or the like. The supply roller 13 is rotatable about an axis of the supply-roller shaft 13A. The roller part 13B can rotate together with the supply-roller shaft 13A.

The agitator 14 includes an agitator shaft 14A, and a flexible sheet 14B. The agitator shaft 14A is rotatable about a second axis 14X extending in the first direction. The agitator shaft 14A is supported to the casing 11 so as to be rotatable about the second axis 14X. The agitator 14 can rotate together with a coupling 22 described later. A base end of the flexible sheet 14B is fixed to the agitator shaft 14A, while a distal end of the flexible sheet 14B can contact an inner surface of the casing 11. The agitator 14 can agitate toner T in the casing 11 as the flexible sheet 14B rotates.

As illustrated in FIG. 1, the transfer roller 4B faces the photosensitive drum 5B. The transfer roller 4B and photosensitive drum 5B nip and convey the sheet S when the sheet S is interposed therebetween.

A charger (not illustrated) is configured to charge a surface of the photosensitive drum 5B, after which the exposure unit (not illustrated) exposes the charged surface to light to form an electrostatic latent image thereon. The developing cartridge 10 supplies toner T to the latent image to form a toner image on the photosensitive drum 5B. As a sheet S fed from the sheet-feeding unit 3 passes between the photosensitive drum 5B and transfer roller 4B, the toner image is transferred from the photosensitive drum 5B onto the sheet S.

After the toner image is transferred onto the sheet S, the sheet S passes through the fixing unit 4C, and the fixing unit 4C thermally fixes the toner image to the sheet S. The sheet S is subsequently discharged from the housing 2 into the discharge tray 2B.

The control unit CU is configured to control the overall operations of the laser printer 1.

The laser printer 1 is further includes a device-side developing electrode 8 as an example of a first electrical component, a device-side supply electrode 9 as an example of a second electrical component, and a sensor 7. The device-side developing electrode 8 is configured to apply a developing bias to a developing electrode 35 described later in response to a command from the control unit CU. In a case where the developing cartridge 10 is attached to the laser printer 1, the device-side developing electrode 8 is positioned to face the developing electrode 35. Specifically, the device-side developing electrode 8 is positioned to face a second electrical contact 35B (described later) of the developing electrode 35 in a case where the developing cartridge 10 is attached to the laser printer 1. More specifically, the device-side developing electrode 8 is positioned to face a developing contact surface 35D (described later) of the second electrical contact 35B in a case where the developing cartridge 10 is attached to the laser printer 1.

The device-side supply electrode 9 is configured to apply a supply bias to a supply electrode 36 described later in response to a command from the control unit CU. In a case where the developing cartridge 10 is attached to the laser printer 1, the device-side supply electrode 9 is positioned to face the supply electrode 36. Specifically, the device-side supply electrode 9 is positioned to face a second electrical contact 36B (described later) of the supply electrode 36 in a case where the developing cartridge 10 is attached to the laser printer 1. More specifically, the device-side supply electrode 9 is positioned to face a supply contact surface 36D (described later) of the second electrical contact 36B in case where the developing cartridge 10 is attached to the laser printer 1.

The sensor 7 is configured to detect whether the developing cartridge 10 is a new product (i.e., whether the developing cartridge 10 is unused) and/or identifies specifications of the developing cartridge 10. The sensor 7 includes a lever 7A that is pivotably supported to the housing 2, and an optical sensor 7B. The lever 7A is disposed in a position for contacting protrusions that rotate together with a detection gear 33 described later. The optical sensor 7B is connected to the control unit CU and is configured to output detection signals to the control unit CU. The control unit CU can determine specifications and the like of the developing cartridge 10 on a basis of the signals received from the optical sensor 7B. Specifically, the optical sensor 7B detects displacement of the lever 7A and transmits the detection signals to the control unit CU on a basis of this displacement. More specifically, the optical sensor 7B employs a sensor unit that includes a light-emitting element and a light-receiving element, for example. The sensor 7 will be described later in greater detail.

Figure 3:
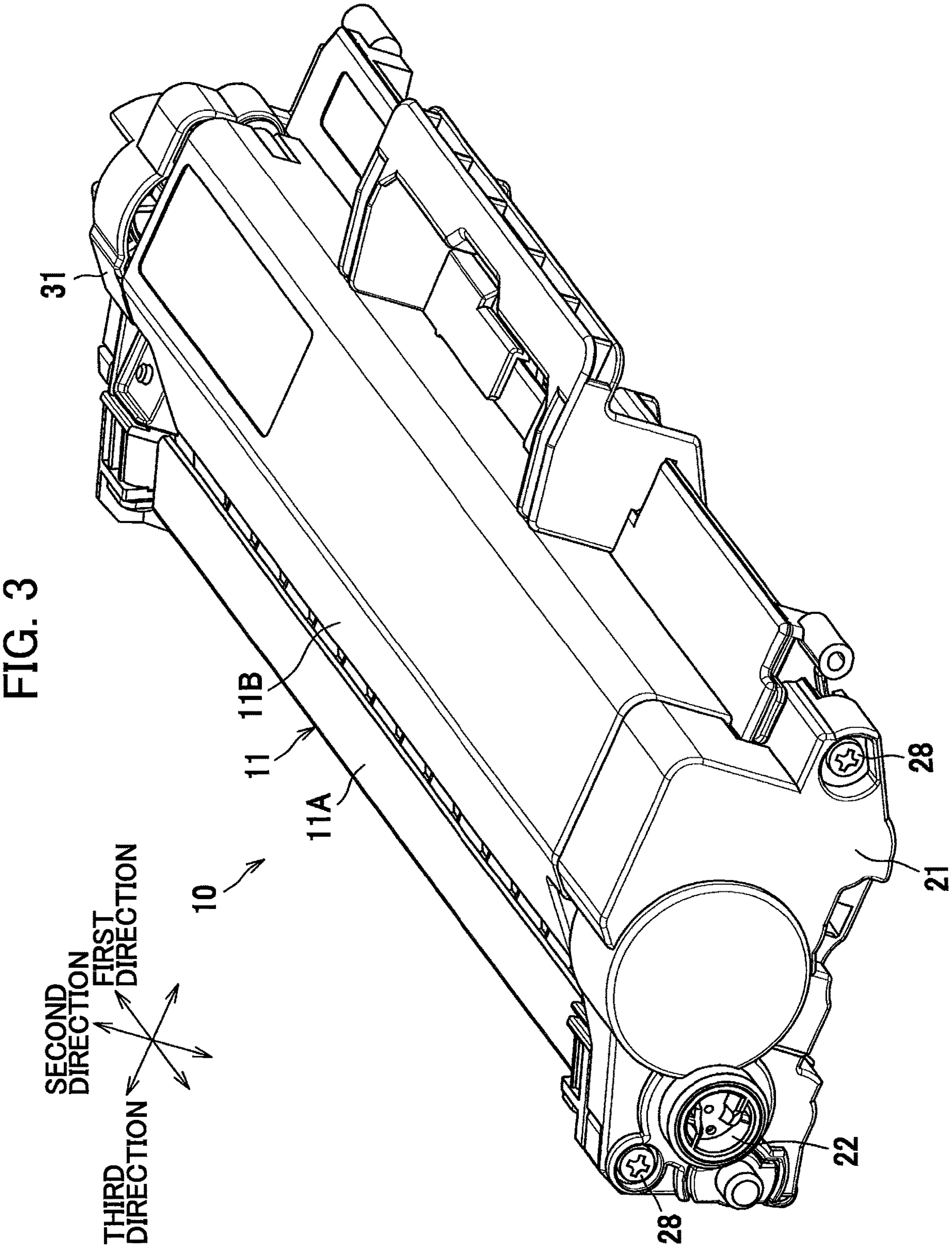
FIG. 3 is a perspective view of the developing cartridge according to the embodiment, and particularly illustrating one side portion of the cartridge as viewed in a first direction.
Figure 4:
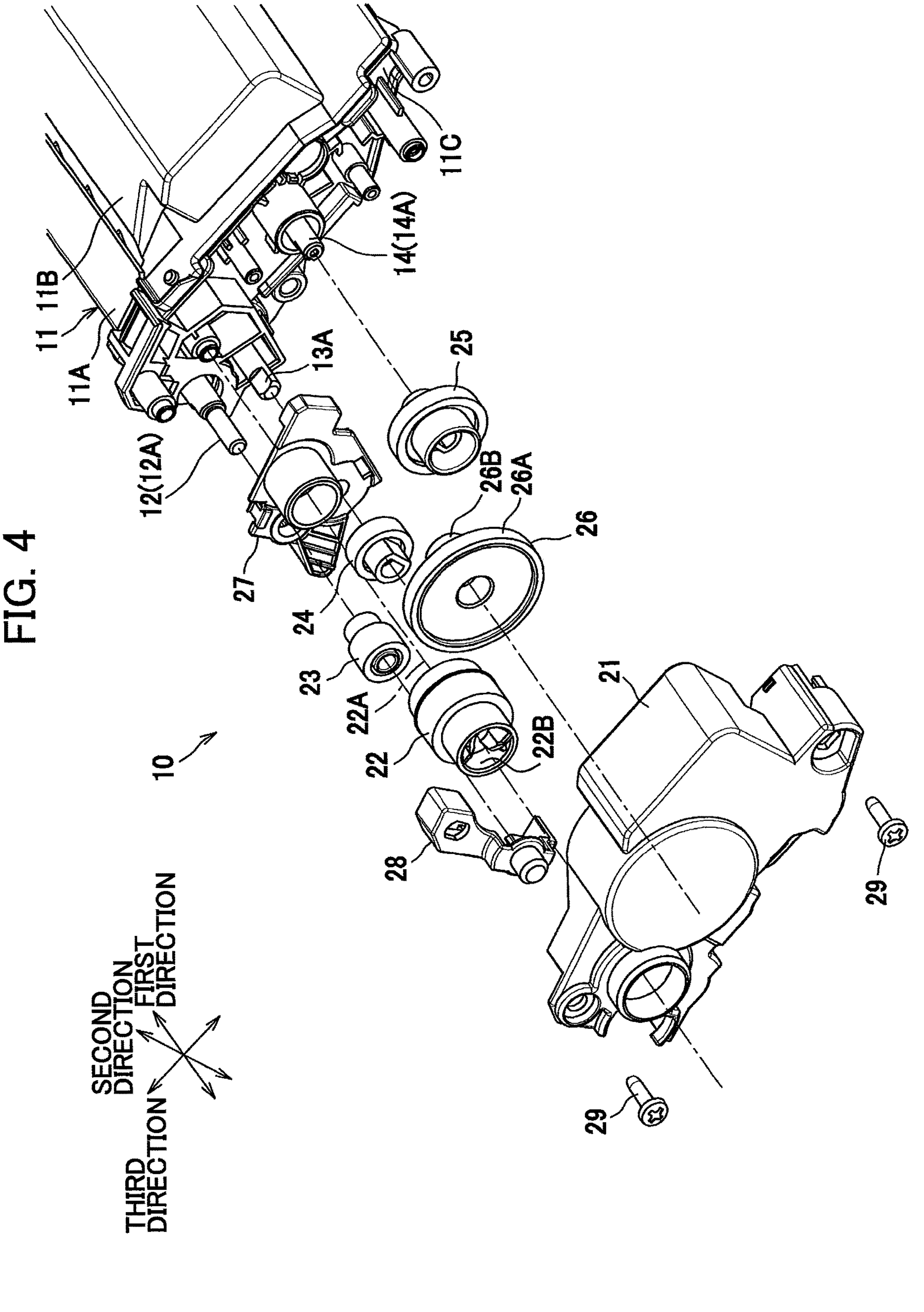
FIG. 4 is an exploded perspective view illustrating components disposed at the one side portion of the casing of the developing cartridge according to the embodiment.

Next, the structure of the developing cartridge 10 will be described in greater detail. FIGS. 3 and 4 illustrate the structure of the developing cartridge 10 at one end of the casing 11 in the first direction (hereinafter called a "first end"). At the first end of the casing 11, the developing cartridge 10 includes a first gear cover 21, the coupling 22, a developing gear 23, a supply gear 24, a first agitator gear 25, an idle gear 26, a first bearing 27, and a cap 28.

The first gear cover 21 supports the idle gear 26 via a shaft (not illustrated). The first gear cover 21 covers at least one gear positioned at the first end of the casing 11. The first gear cover 21 is fixed to an outer surface 11C of the casing 11 by screws 29.

Note that the term "gear" in the present specification is not limited to a gear member having gear teeth that transmits rotational force through the gear teeth, but may include a member that transmits rotational force through friction.

The coupling 22 is rotatable about a first axis 22A extending in the first direction. The coupling 22 is positioned at the first end of the casing 11 relative to the first direction. That is the coupling 22 is positioned at the outer surface 11C. The coupling 22 can rotate in response to a drive force. That is, the coupling 22 can receive a drive force from the laser printer 1. The coupling 22 can rotate by engaging with a drive member (not illustrated) provided in the laser printer 1. The coupling 22 includes a recessed part 22B (FIG. 4) that is recessed in the first direction. The recessed part 22B can receive and engage with the drive member. Specifically, the recessed part 22B can engage with the drive member of the laser printer 1 to receive a drive force from the drive member.

The developing gear 23 is mounted to the developing-roller shaft 12A and can rotate together with the coupling 22. The developing gear 23 is positioned at the first end of the casing 11 in the first direction. That is, the developing gear 23 is positioned at the outer surface 11C.

The supply gear 24 is mounted to the supply-roller shaft 13A and can rotate together with the coupling 22. The supply gear 24 is positioned at the first end of the casing 11 in the first direction. That is, the supply gear 24 is positioned at the outer surface 11C.

The first agitator gear 25 is positioned at the first end of the casing 11 in the first direction. That is, the first agitator gear 25 is positioned at the outer surface 11C. The first agitator gear 25 is mounted to the agitator shaft 14A of the agitator 14. The first agitator gear 25 can rotate together with the agitator 14 in response to rotation of the coupling 22.

The idle gear 26 is positioned to face the first end of the casing 11 in the first direction. That is, the idle gear 26 is positioned to face the outer surface 11C. The idle gear 26 includes a large-diameter part 26A that engages with gear teeth of the coupling 22, and a small-diameter part 26B that engages with gear teeth of the first agitator gear 25. As described above, the idle gear 26 is rotatably supported on the shaft (not illustrated) in the first gear cover 21. The idle gear 26 transmits the rotation of the coupling 22 to the first agitator gear 25 while reducing the speed of rotation. The large-diameter part 26A is separated farther from the casing 11 than the small-diameter part 26B is from the casing 11 in the first direction.

The first bearing 27 supports the coupling 22, the developing gear 23, and the supply gear 24.

The first bearing 27 is fixed to the first end of the casing 11 in the first direction.

The cap 28 covers a first end of the developing-roller shaft 12A in the first direction. Note that the first gear cover 21 and cap 28 may be formed of different types of resin.

Figure 5:
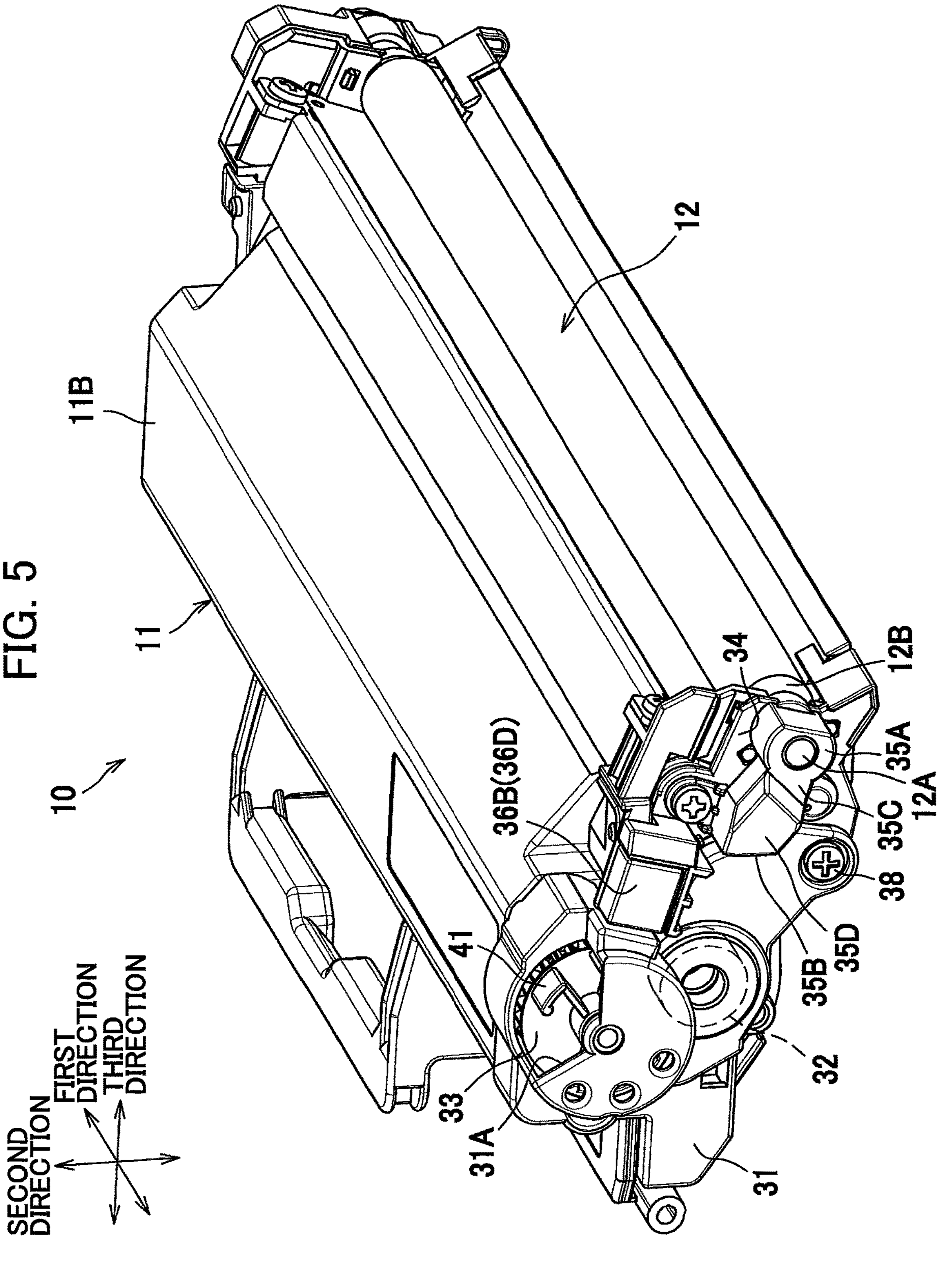
FIG. 5 is a perspective view of the developing cartridge according to the embodiment, and particularly illustrating another side portion of the cartridge as viewed in the first direction.
Figure 6:
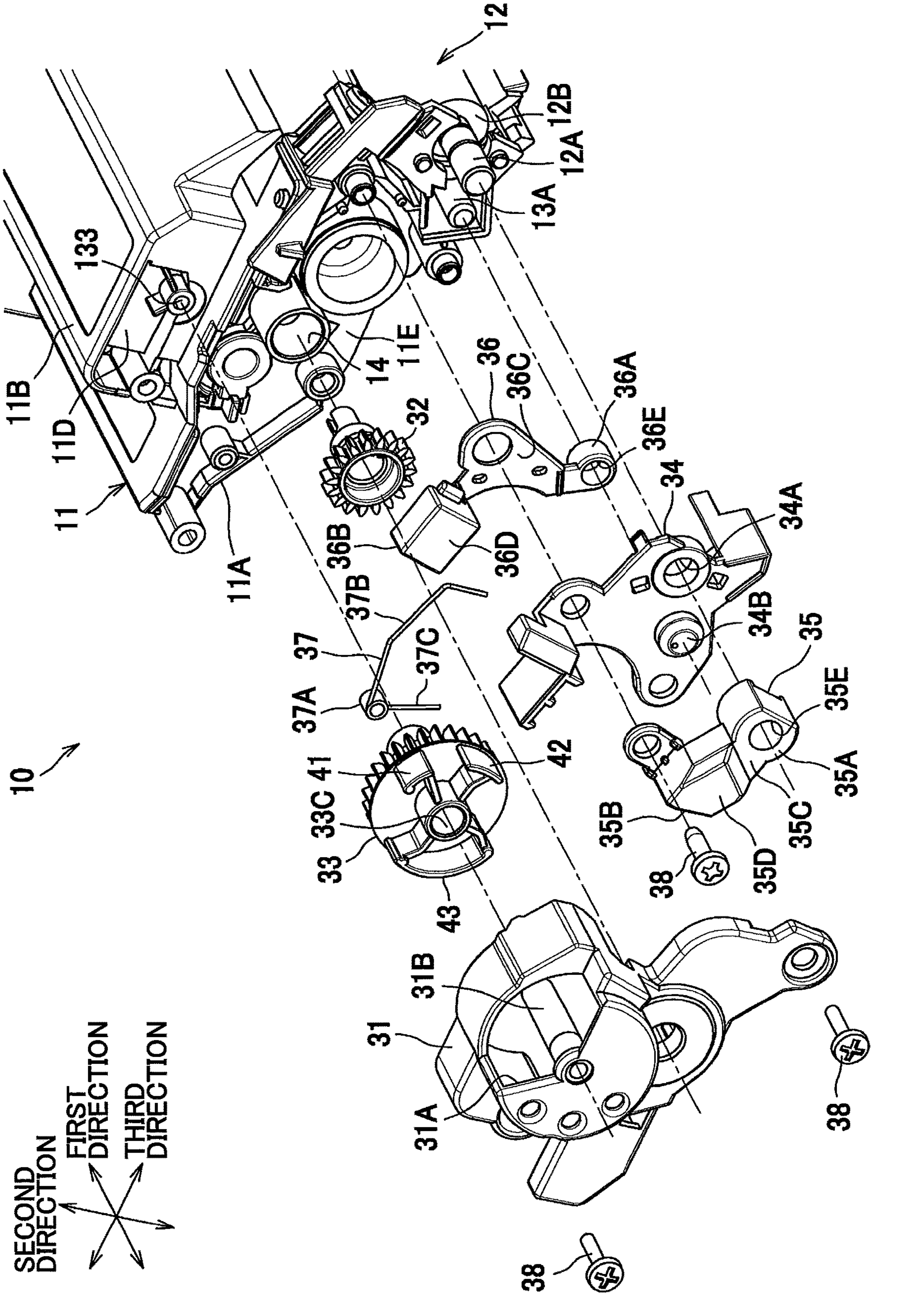
FIG. 6 is an exploded perspective view illustrating components disposed at the other side portion of the casing of the developing cartridge according to the embodiment.

FIGS. 5 and 6 illustrate the structure of the developing cartridge 10 at the other end of the casing 11 in the first direction (hereinafter called a "second end"). At the second end, the developing cartridge 10 includes a second gear cover 31 as an example of a gear cover, a second agitator gear 32, the above-mentioned detection gear 33, a second bearing 34, the above-mentioned developing electrode 35, and the above-mentioned supply electrode 36.

The second gear cover 31 covers at least a portion of the detection gear 33. The second gear cover 31 has an opening 31A that exposes a portion of the detection gear 33 to an outside. The second gear cover 31 also includes a shaft 31B extending in the first direction. The second gear cover 31 accommodates therein a torsion spring 37 as an example of a spring. The torsion spring 37 will be described later in greater detail.

The second agitator gear 32 is positioned at the second end of the casing 11 in the first direction. That is, the second agitator gear 32 is positioned at an outer surface 11E of the casing 11. The outer surface 11E is positioned at the second end of the container 11A in the first direction. The second agitator 32 is mounted to the agitator shaft 14A of the agitator 14 and can rotate together with the agitator 14. The second agitator gear 32 includes gear teeth around its entire circumference. The second agitator gear 32 is positioned at the container 11A and is rotatably supported to the container 11A.

The detection gear 33 is positioned at the second end of the casing 11 in the first direction. That is, the detection gear 33 is positioned at the outer surface 11E. The detection gear 33 engages with the second agitator gear 32 and can rotate together with the second agitator gear 32. The detection gear 33 has a first hole 33C. The shaft 31B of the second gear cover 31 is inserted into the first hole 33C so that the detection gear 33 can rotate about the shaft 31B. The lid 11B of the casing 11 includes a side wall 11D at the second end of the casing 11 in the first direction. The side wall 11 D has a support hole 133. The distal end of the shaft 31B is inserted into and supported by the support hole 133. The detection gear 33 is capable of rotating irreversibly from a first position to a second position. The detection gear 33 rotates in the clockwise direction in FIG. 6.

The detection gear 33 includes a first protrusion 41, a second protrusion 42, and a third protrusion 43. The first protrusion 41, second protrusion 42, and third protrusion 43 can move along with the rotation of the detection gear 33, and preferably can rotate together with the detection gear 33. In the present embodiment, the detection gear 33 includes the first protrusion 41, second protrusion 42, and third protrusion 43. In other words, the detection gear 33 is integrally formed with the first protrusion 41, second protrusion 42, and third protrusion 43. Note that the detection gear 33 need not include three protrusions, but may include one or two of the first protrusion 41, second protrusion 42 and third protrusion 43.

The first protrusion 41, second protrusion 42, and third protrusion 43 are positioned at intervals along the rotating direction of the detection gear 33. More specifically, the first protrusion 41, second protrusion 42, and third protrusion 43 are arranged in the clockwise direction in FIG. 6 in the order given and are spaced apart from each other in the rotating direction. Each of the first protrusion 41, second protrusion 42, and third protrusion 43 extends outward in radial directions of the detection gear 33. The distal end of each of the first protrusion 41, second protrusion 42, and third protrusion 43 is positioned at the outer circumference of the detection gear 33. That is, the distal end of the first protrusion 41, second protrusion 42, and third protrusion 43 are positioned farthest from the rotational center of the detection gear 33. The distal ends of the first protrusion 41 and second protrusion 42 have a prescribed length in the rotating direction, while the distal end of the third protrusion 43 is longer in the rotating direction than the first protrusion 41 and second protrusion 42.

Figure 8A:
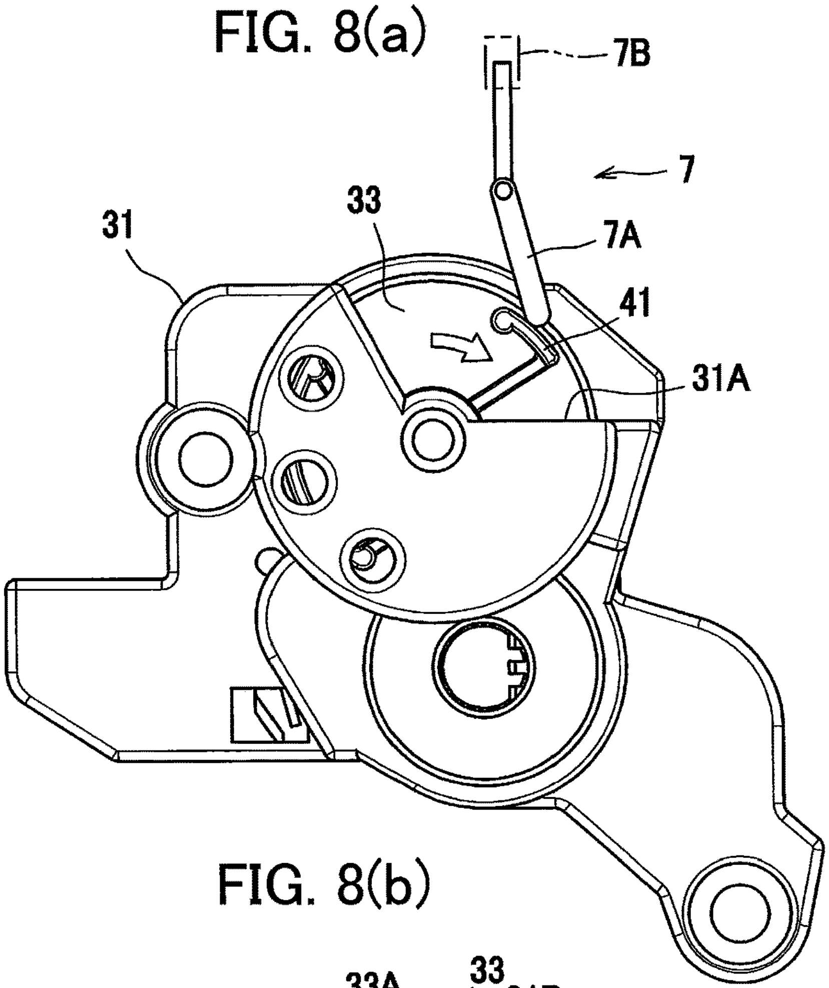
FIG. 8(*a*) is a view illustrating a first position of a detection gear in the developing cartridge according to the embodiment, when viewed from an outside of a gear cover.
Figure 8B:
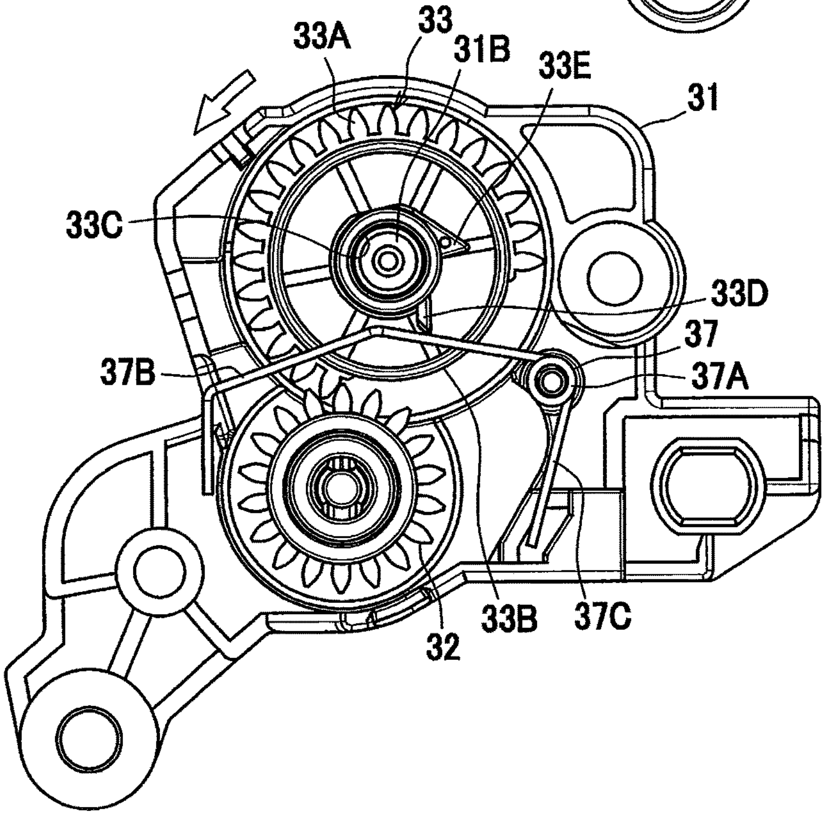

In a case where the developing cartridge 10 is unused (i.e., a new product), the detection gear 33 is in the position illustrated in FIGS. 8(*a*) and 8(*b*) relative to the second gear cover 31. Hereinafter, this position of the detection gear 33 will be referred to as a first position. Note that the detection gear 33 is in the first position in a case where the developing cartridge 10 is in an unused state. In a case where the detection gear 33 is in the first position, the distal end of the first protrusion 41 is exposed to an outside through the opening 31A. Further, in a case where the detection gear 33 is in the first position, the distal end of the first protrusion 41 contacts the lever 7A and maintains the lever 7A between the light-emitting element and light-receiving element of the optical sensor 7B, as illustrated in FIG. 8(*a*). Consequently, the lever 7A blocks light emitted from the light-emitting element. The detection gear 33 includes a gear section 33A. The gear section 33A includes a plurality of gear teeth and the gear section 33A is provided at a portion of the circumference of the detection gear 33. The detection gear 33 also includes a toothless section 33B. The toothless section 33B is provided at the remaining circumference of the detection gear 33 and the toothless section 33B is a region with no gear teeth. The detection gear 33 also includes a fourth protrusion 33D, and a fifth protrusion 33E. Each of the fourth protrusion 33D and fifth protrusion 33E protrudes radially outward from the peripheral edge of the first hole 33C. The torsion spring 37 includes a coil part 37A, a first arm 37B, and a second arm 37C. The first arm 37B and second arm 37C both extend from the coil part 37A. The second arm 37C contacts and catches a portion of the second gear cover 31. In a case where the detection gear 33 is in the first position, the first arm 37B contacts the fourth protrusion 33D and urges the detection gear 33 such that the leading gear tooth in the rotating direction of the gear section 33A (counterclockwise in FIG. 8(*b*)) is pressed against the gear teeth of the second agitator gear 32. Hence, the second agitator gear 32 meshes with at least one of the gear teeth of the gear section 33A in a case where the detection gear 33 is positioned at the first position. The torsion spring 37 holds the detection gear 33 in a prescribed posture relative to the shaft 31B.

Figure 9A:
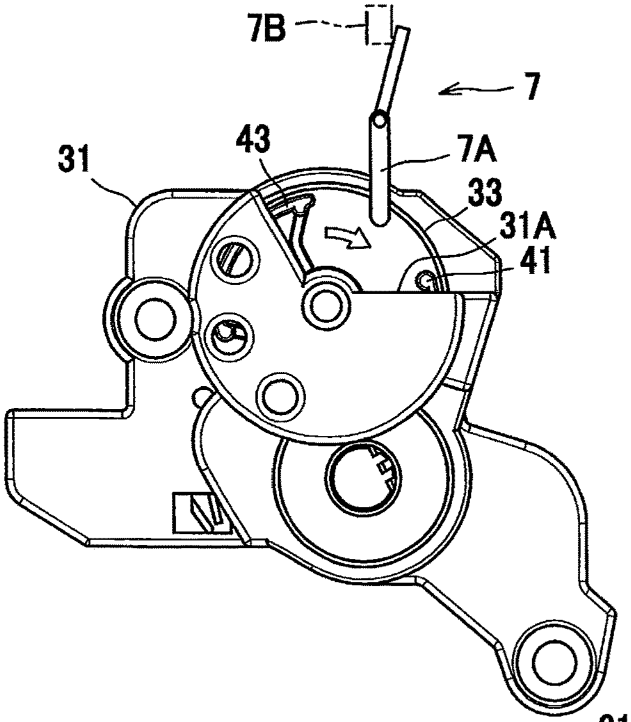
FIG. 9(*a*) is a view illustrating an actuator positioned between a first protrusion and a third protrusion in the developing cartridge according to the embodiment.
Figure 9B:
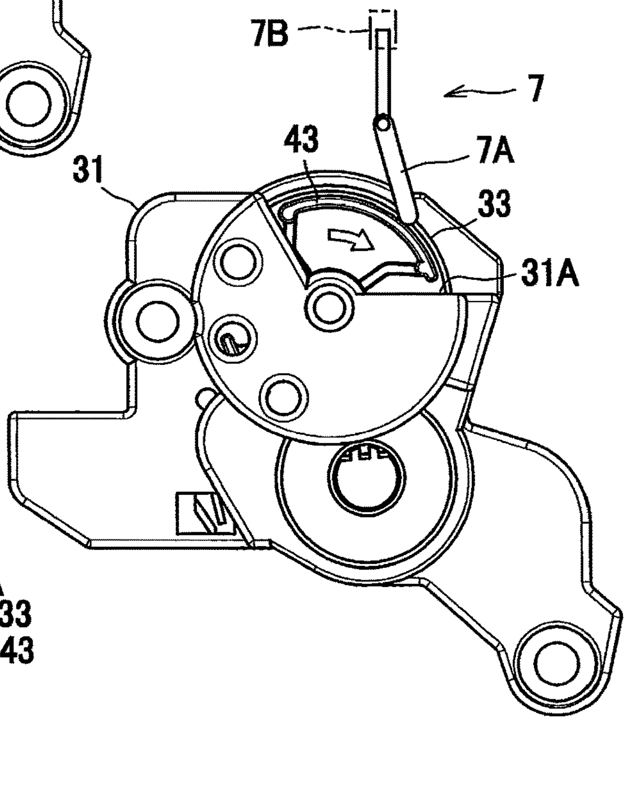
Figure 9C:
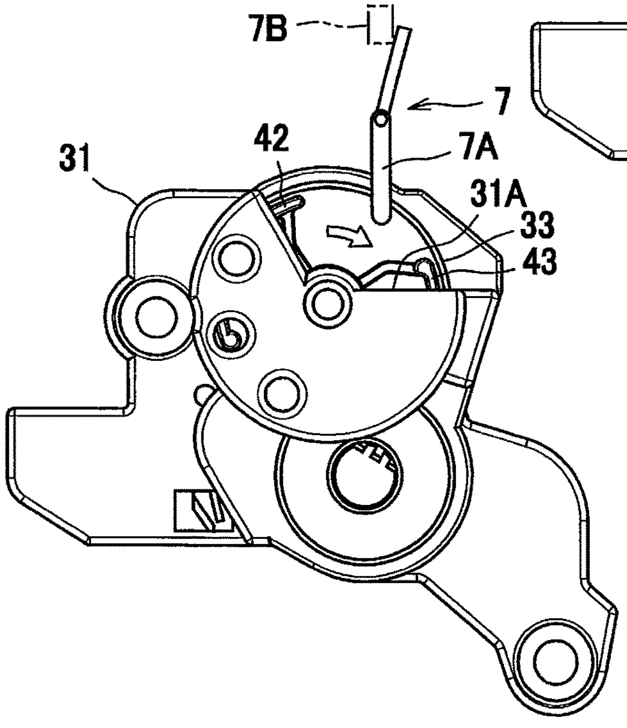
Figure 10A:
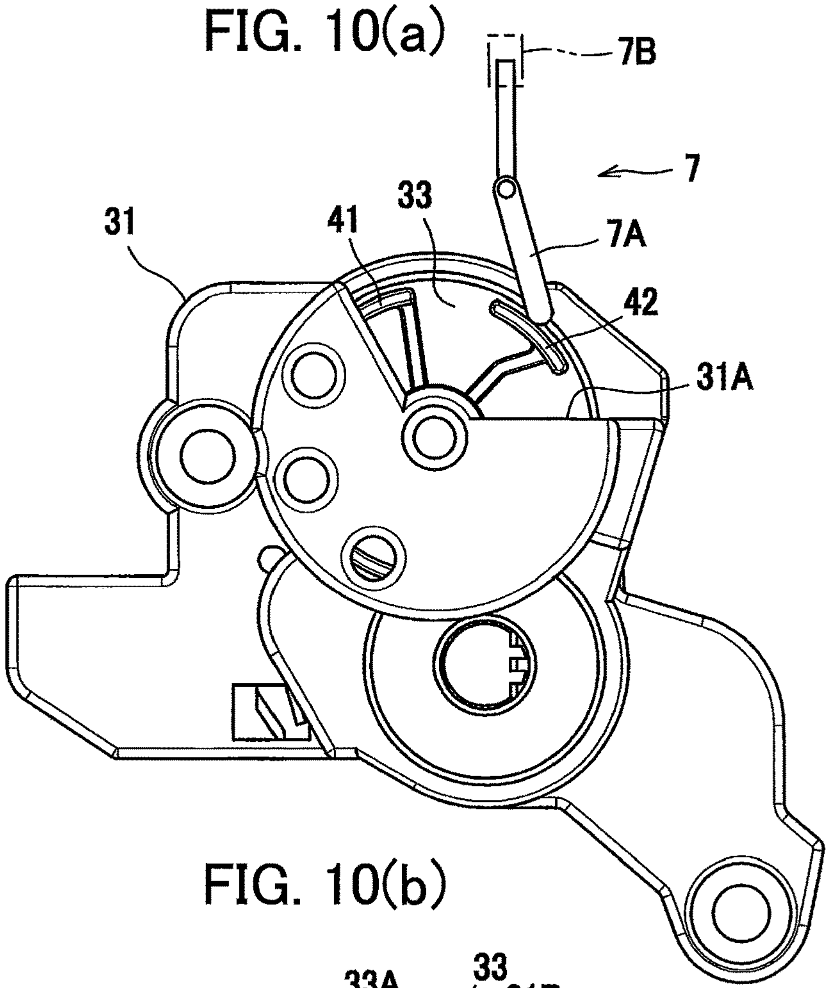
FIG. 10(*a*) is a view illustrating a second position of the detection gear in the developing cartridge according to the embodiment, when viewed from the outside of the gear cover.
Figure 10B:
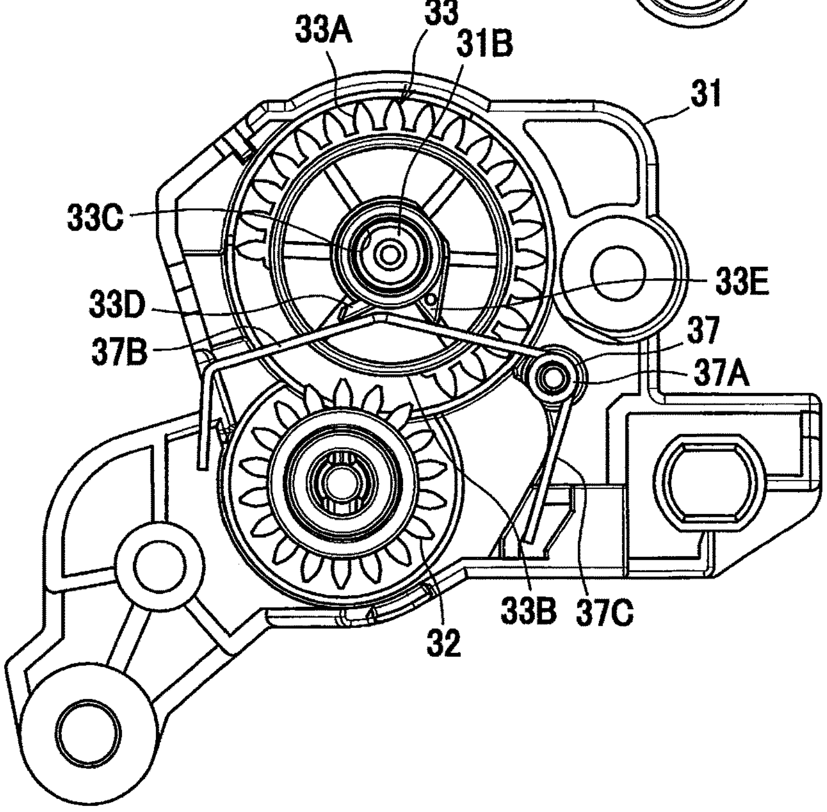

The detection gear 33 is configured to rotate from the first position illustrated in FIGS. 8(*a*) and 8(*b*), through the positions illustrated in FIGS. 9(*a*), 9(*b*) and 9(*c*) to a second position illustrated in FIG. 10(*a*), where the detection gear 33 comes to a halt. Hence, the detection gear 33 can rotate from the first position to the second position. In a case where the detection gear 33 is in the second position illustrated in FIG. 10(*b*), the first arm 37B of the torsion spring 37 contacts both the fourth protrusion 33D and fifth protrusion 33E and maintains the detection gear 33 in the state illustrated in FIG. 10(*b*) relative to the shaft 31B. In a case where the detection gear 33 is in the second position as illustrated in FIG. 10(*b*), the second protrusion 42 is in substantially the same position as the first protrusion 41 when the detection gear 33 is in the first position as illustrated in FIG. 8(*a*). In a case where the detection gear 33 is in the second position, the distal end of the second protrusion 42 contacts the lever 7A and maintains the lever 7A at a position between the light-emitting element and light-receiving element, as illustrated in FIG. 10(*a*). Consequently, the lever 7A blocks light emitted from the light-emitting element.

Further, the detection gear 33 rotates from the first position to the second position through third positions illustrated in FIGS. 9(*a*) and 9(*c*). In the third positions, the detection gear 33 does not contact any part of the laser printer 1 (and particularly the lever 7A). As illustrated in FIGS. 9(*a*) and 9(*c*), the lever 7A is not in contact with the distal end of any of the first protrusion 41, second protrusion 42, and third protrusion 43 in a case where the detection gear 33 is in the third positions. Hence, the lever 7A is not positioned between the light-emitting element and light-receiving element. Consequently, the lever 7A does not block light emitted from the light-emitting element, and the light-receiving element can receive the emitted light.

As described above, the laser printer 1 can identify specifications of the developing cartridge 10 based on detection signals obtained from the optical sensor 7B in a case where the light-receiving element receives light and in a case where the light-receiving element does not receive light.

Further, in the present embodiment, the distal end of the first protrusion 41 contacts the lever 7A in a case where the detection gear 33 is in the initial position, and the distal end of the second protrusion 42 contacts the lever 7A when the detection gear 33 is in the second position. Accordingly, the laser printer 1 can determine whether the developing cartridge 10 is attached to the laser printer 1 through use of the first protrusion 41 and second protrusion 42.

Turning back to FIG. 6, the second bearing 34 includes a first support part 34A, and a second support part 34B. The first support part 34A rotatably supports the developing-roller shaft 12A. The second support part 34B rotatably supports the supply-roller shaft 13A. The second bearing 34 is fixed to the outer surface 11E at the second end of the container 11A of the casing 11 while supporting the developing-roller shaft 12A and supply-roller shaft 13A.

As illustrated in FIG. 6, the developing electrode 35 is positioned at the second end of the casing 11 in the first direction. In other words, the developing electrode 35 is positioned at the outer surface 11E. The developing electrode 35 is configured to supply power to the developing-roller shaft 12A. The developing electrode 35 is formed of an electrically conductive resin, for example.

The developing electrode 35 includes a first electrical contact 35A, the above-mentioned second electrical contact 35B, and a coupling part 35C. The first electrical contact 35A contacts the developing-roller shaft 12A. The second electrical contact 35B can contact the device-side developing electrode 8 (FIG. 1) in a case where the developing cartridge 10 is attached to the laser printer 1. The coupling part 35C connects the first electrical contact 35A to the second electrical contact 35B and is electrically connected to both the first electrical contact 35A and second electrical contact 35B.

The first electrical contact 35A has a second hole 35E. The developing-roller shaft 12A is inserted into the second hole 35E. The second hole 35E is preferably a circular-shaped hole. In a case where the developing-roller shaft 12A is inserted into the second hole 35E, the first electrical contact 35A contacts a portion of the developing-roller shaft 12A. Specifically, the first electrical contact 35A contacts the circumferential surface of the developing-roller shaft 12A while the developing-roller shaft 12A is inserted in the second hole 35E. The second electrical contact 35B of the developing electrode 35 includes the above-mentioned developing contact surface 35D. The developing contact surface 35D extends in the second and third directions.

The supply electrode 36 is positioned at the second end of the casing 11 in the first direction. That is, the supply electrode 36 is positioned at the outer surface 11E. The supply electrode 36 supplies power to the supply-roller shaft 13A. The supply electrode 36 is formed of an electrically conductive resin, for example. The supply electrode 36 includes a first electrical contact 36A, the above-mentioned second electrical contact 36B, and a coupling part 36C. The first electrical contact 36A contacts the supply-roller shaft 13A. The second electrical contact 36B can contact the device-side supply electrode 9 (FIG. 1) in a case where the developing cartridge 10 is attached to the laser printer 1. The coupling part 36C connects the first electrical contact 36A and second electrical contact 36B and is electrically connected to both the first electrical contact 36A and second electrical contact 36B.

The first electrical contact 36A has a third hole 36E. The supply-roller shaft 13A is inserted into the third hole 36E. The third hole 36E is preferably a circular-shaped hole. In a case where the supply-roller shaft 13A is inserted into the third hole 36E, the first electrical contact 36A contacts a portion of the supply-roller shaft 13A. Specifically, the first electrical contact 36A contacts the circumferential surface of the supply-roller shaft 13A while the supply-roller shaft 13A is inserted into the third hole 36E. The second electrical contact 36B of the supply electrode 36 includes the above-mentioned supply contact surface 36D. The supply contact surface 36D extends in the second and third directions.

Together with the second bearing 34, the developing electrode 35 and supply electrode 36 are fixed to the outer surface 11E positioned at the second end of the casing 11 with screws 38.

Figure 7:
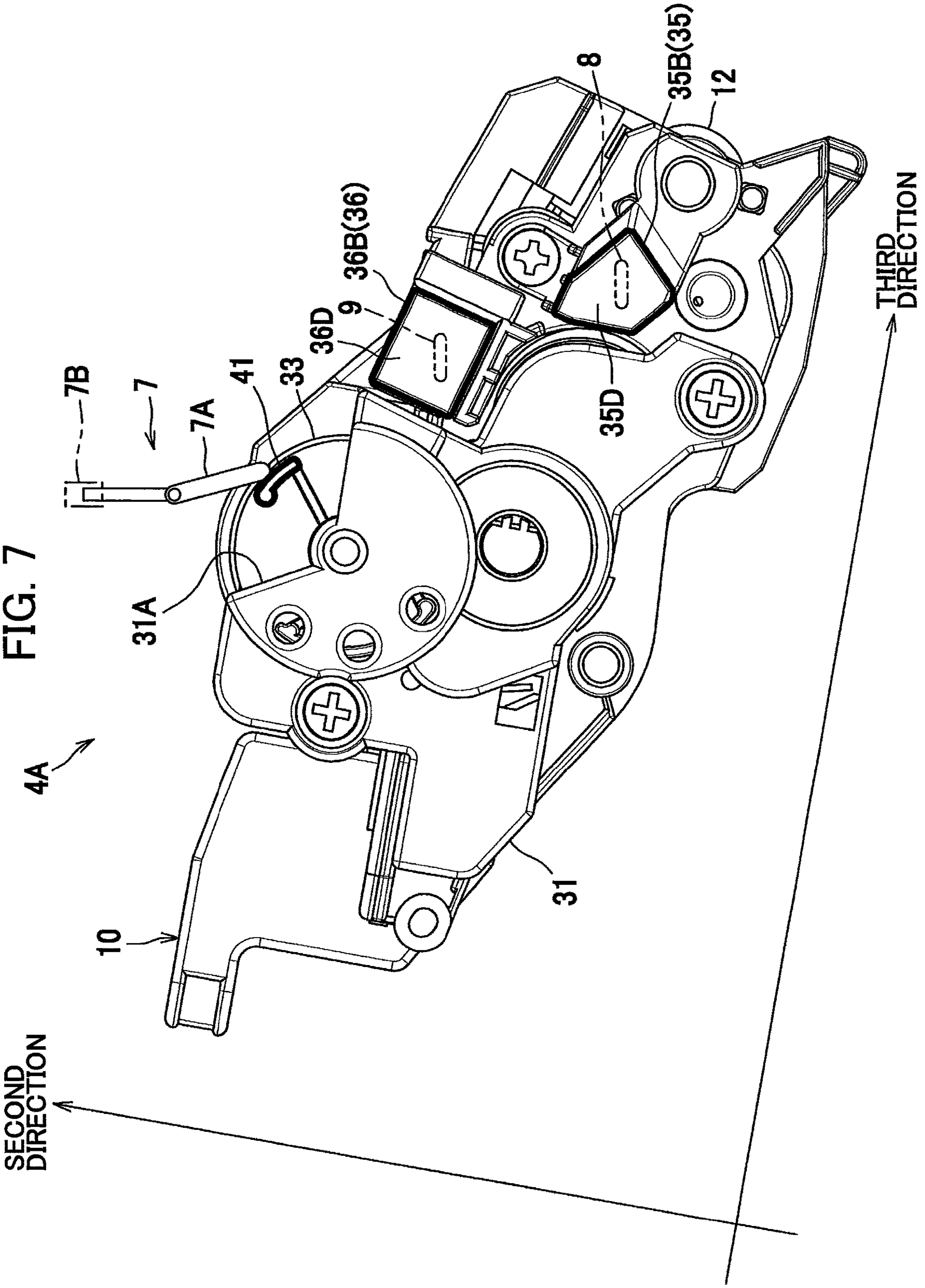
FIG. 7 is a side view of the developing cartridge according to the embodiment and particularly showing the other side of the developing cartridge in the first direction.

As illustrated in FIGS. 5 and 7, the second electrical contact 35B of the developing electrode 35 is positioned closer to the developing roller shaft 12A than the second agitator gear 32 is to the developing-roller shaft 12A in the third direction. Further, the second electrical contact 35B of the developing electrode 35 is positioned farther from the developing roller shaft 12A than the first electrical contact 35A is from the developing-roller shaft 12A in both the second and third directions.

Further, the second electrical contact 36B of the supply electrode 36 is positioned closer to the developing roller shaft 12A than the second agitator gear 32 is to the developing-roller shaft 12A in the third direction. In addition, the second electrical contact 36B of the supply electrode 36 is positioned farther from the developing roller shaft 12A than the second electrical contact 35B of the developing electrode 35 is from the developing-roller shaft 12A in both the second and third directions.

The detection gear 33 is positioned farther from the developing-roller shaft 12A than the second electrical contact 36B of the supply electrode 36 is from the developing-roller shaft 12A in the third direction. Further, when the detection gear 33 is in the first position as illustrated in FIG. 9(*a*), the distal end of the first protrusion 41 is positioned farther from the developing-roller shaft 12A than the second electrical contact 36B of the supply electrode 36 is from the developing-roller shaft 12A in both the second and third directions. In a case where the detection gear 33 is in the second position as illustrated in FIG. 10(*a*), the distal end of the second protrusion 42 is at approximately the same position as the first protrusion 41 in a case where the detection gear 33 is in the first position. Therefore, in a case where the detection gear 33 is in the second position, the distal end of the second protrusion 42 is positioned farther from the developing-roller shaft 12A than the second electrical contact 36B of the supply electrode 36 is from the developing-roller shaft 12A in both the second and third directions.

Thus, the second electrical contact 35B of the developing electrode 35, the second electrical contact 36B of the supply electrode 36, and the distal end of the first protrusion 41 are at different positions in the second and third directions in a case where the detection gear 33 is in the first position. Further, the second electrical contact 35B of the developing electrode 35, the second electrical contact 36B of the supply electrode 36, and the distal end of the second protrusion 42 are at different positions in the second and third directions in a case where the detection gear 33 is in the second position.

Next, operation of the developing cartridge 10 thus constructed will be described. As illustrated in FIG. 1, the developing cartridge 10 is attached to the laser printer 1 by inserting the developing cartridge 10 such that the developing roller 12 is a leading end in the third direction, i.e., in the inserting direction.

Through this operation, the developing contact surface 35D of the developing cartridge 10 contacts the device-side developing electrode 8, and the supply contact surface 36D contacts the device-side supply electrode 9. At this time, each of the developing contact surface 35D and supply contact surface 36D extends in both the second and third directions. Therefore, contact between the second electrical contact 35B and the device-side developing electrode 8 and between the second electrical contact 36B and the device-side supply electrode 9 is smooth. Since the positions of the second electrical contact 35B and the second electrical contact 36B are offset in both the second and third directions, the device-side supply electrode 9 is prevented from scraping against the second electrical contact 35B and the device-side developing electrode 8 is prevented from scraping against the second electrical contact 36B.

In a case where the developing cartridge 10 is unused as illustrated in FIG. 1, i.e., when the detection gear 33 is in the first position, the distal end of the first protrusion 41 is exposed through the opening 31A. Accordingly, the distal end of the first protrusion 41 contacts and pivots the lever 7A. In a case where the optical sensor 7B detects this displacement of the lever 7A, the control unit CU can determine that the developing cartridge 10 is attached to the laser printer 1, as described earlier. Here, the second protrusion 42 is not exposed through the opening 31A in a case where the detection gear 33 is in the first position and, hence, does not contact the lever 7A. Since the distal end of the first protrusion 41 is offset from the second electrical contact 35B of the developing electrode 35 in both second and third directions, this construction prevents the device-side developing electrode 8 from contacting the first protrusion 41 and prevents the lever 7A from contacting the second electrical contact 35B.

In response to a command from the control unit CU, the laser printer 1 begins driving the coupling 22 through the drive member (not illustrated). As illustrated in FIG. 4, rotation of the coupling 22 is transmitted via the idle gear 26 to the first agitator gear 25 and rotates the first agitator gear 25. In a case where the first agitator gear 25 rotates, the second agitator gear 32 provided at the second end of the developing cartridge 10 is rotated via the agitator 14.

In a case where an unused developing cartridge 10 is attached to the housing 2, the detection gear 33 is positioned at the first position illustrated in FIGS. 8(*a*) and 8(*b*). In a case where the second agitator gear 32 rotates in this state, the second agitator gear 32 transmits a drive force to the gear teeth on the detection gear 33 meshed with the second agitator gear 32, causing the detection gear 33 to rotate.

In a case where the detection gear 33 rotates, the lever 7A becomes positioned between the first protrusion 41 and third protrusion 43 as illustrated in FIG. 9(*a*). In other words, none of the first protrusion 41, second protrusion 42, and third protrusion 43 contacts the lever 7A. Consequently, the lever 7A is no longer positioned between the light-emitting element and light-receiving element of the optical sensor 7B, and the signal that the control unit CU receives from the optical sensor 7B changes. FIG. 9(*a*) shows the detection gear 33 in one of the third positions.

As the detection gear 33 continues to rotate, the third protrusion 43 becomes exposed through the opening 31A and contacts the lever 7A as illustrated in FIG. 9(*b*). This contact moves the lever 7A back to a position between the light-emitting element and light-receiving element of the optical sensor 7B. Accordingly, the signal that the control unit CU receives from the optical sensor 7B changes again.

As the detection gear 33 continues to rotate, the lever 7A becomes positioned between the third protrusion 43 and second protrusion 42 as illustrated in FIG. 9(*c*). At this time, none of the first protrusion 41, second protrusion 42, and third protrusion 43 contacts the lever 7A. Accordingly, the lever 7A is no longer positioned between the light-emitting element and light-receiving element of the optical sensor 7B, and the signal that the control unit CU receives from the optical sensor 7B changes again. FIG. 9(*c*) shows the detection gear 33 in the remaining one of the third positions.

As the detection gear 33 continues to rotate, the second protrusion 42 becomes exposed through the opening 31A and contacts the lever 7A as illustrated in FIG. 10(*a*). This contact moves the lever 7A to a position between the light-emitting element and light-receiving element of the optical sensor 7B, once again changing the signal that the control unit CU receives from the optical sensor 7B. FIGS. 10(*a*) and 10(*b*) show the detection gear 33 in the second position. As illustrated in FIG. 10(*b*), in a case where the detection gear 33 is in the second position, the second agitator gear 32 faces the toothless section 33B of the detection gear 33 and, hence, is not meshed with any of the plurality of gear teeth of the gear section 33A. Since the torsion spring 37 maintains the posture of the detection gear 33 at this time, the detection gear 33 does not rotate thereafter, even when the second agitator gear 32 rotates.

Through the operation process described above, the output from the optical sensor 7B changes four times after the detection gear 33 begins to rotate. The pattern of these changes in output (e.g., the lengths of the OFF signals or ON signals, the number of changes, or differences in the timing of the changes) can be varied by modifying the number of protrusions that rotate together with the detection gear 33 and the lengths of the protrusions in the rotating direction. By establishing correlations between signal patterns and specifications of developing cartridges 10 in advance, the control unit CU can identify specifications of the developing cartridge 10.

In a case where a used developing cartridge 10 is attached to the housing 2 of the laser printer 1, the detection gear 33 is already positioned in the second position. In this case, the distal end of the second protrusion 42 is at the same approximate position as the first protrusion 41 of an unused developing cartridge 10, as described above. Hence, in a case where a used developing cartridge 10 is attached to the housing 2, the distal end of the second protrusion 42 contacts the lever 7A, enabling the control unit CU to detect that a developing cartridge 10 is attached to the housing 2. Note that the first protrusion 41 may be partially exposed through the opening 31A in a case where the detection gear 33 is in the second position. However, the first protrusion 41 does not contact the lever 7A since the first protrusion 41 is separated away from the second protrusion 42.

With the developing cartridge 10 according to the embodiment described above, the second electrical contact 35B of the developing electrode 35, the second electrical contact 36B of the supply electrode 36, and the distal end of the first protrusion 41 are at different positions in the second and third directions in a case where the developing cartridge 10 is in an unused state. This arrangement prevents the distal end of the first protrusion 41 from scraping against the device-side developing electrode 8, prevents the second electrical contact 35B from scraping against the lever 7A, and prevents the second electrical contact 36B from scraping against the lever 7A, for example. Further, the second electrical contact 35B, second electrical contact 36B, and distal end of the second protrusion 42 are also arranged at different positions in the second and third directions after the developing cartridge 10 is used. Therefore, this arrangement prevents the distal end of the second protrusion 42 from scraping against the device-side developing electrode 8, prevents the second electrical contact 35B from scraping against the lever 7A, and prevents the second electrical contact 36B from scraping against the lever 7A, for example.

Various modifications are conceivable.

In the embodiment described above, the first protrusion 41, the second protrusion 42, and the third protrusion 43 can rotate together with the detection gear 33, but the embodiment is not limited to this arrangement. For example, each of the protrusions may not be rotatable together with the detection gear, but may be provided separately from the detection gear, and the detection gear may be provided with a cam. Specifically, the detection gear moves together with the rotation of a coupling. While rotating, the detection gear shifts between a state in which the cam contacts a protrusion and a state in which the cam does not contact a protrusion. In this way, the protrusions are moved through contact with the cam. However, the protrusions may also be moved linearly as long as the protrusions can move the lever 7A.

In the embodiment described above, the developing electrode 35 and supply electrode 36 are formed of an electrically conductive resin, but the composition of these components is not particularly limited. For example, the developing electrode 35 or the supply electrode 36 may be configured of a metal plate rather than an electrically conductive resin. In this case, one end portion of the metal plate serves as the first electrical contact 35A of the developing electrode 35 or the first electrical contact 36A of the supply electrode 36, while the other end portion of the metal plate serves as the second electrical contact 35B of the developing electrode 35 or the second electrical contact 36B of the supply electrode 36. Alternatively, the developing electrode 35 or supply electrode 36 may be configured of a metal plate combined with a coil spring. Further, the first electrical contact 35A of the developing electrode 35 may be electrically connected to the developing-roller shaft 12A through a metallic member. More specifically, the first electrical contact 35A and developing-roller shaft 12A are electrically connected via a spring, preferably coil spring. Further, the first electrical contact 36A of the supply electrode 36 may be electrically connected to the supply-roller shaft 13A via a metallic member. More specifically, the first electrical contact 36A and supply-roller shaft 13A are electrically connected via a spring, preferably coil spring.

In the embodiment described above, the developing cartridge 10 is configured as a separate component from the drum cartridge 5, but the two components may be integrally configured.

In the embodiment described above, a monochrome laser printer is used as an example of the image forming apparatus, but the image forming apparatus may be a color image forming apparatus. Further, the exposure unit in the image forming apparatus may employ LED light rather than laser light. Further, the image forming apparatus may be a photocopier or multifunction device, for example.

While the description has been made in detail with reference to the embodiment(s) thereof, it would be apparent to those skilled in the art that many modifications and variations may be made therein without departing from the spirit of the disclosure.

What is claimed is:

1. A developing cartridge comprising:

a casing configured to accommodate toner therein;

a developing roller including a developing roller shaft extending in an axial direction;

a coupling rotatable about a rotational axis extending in the axial direction, the coupling being positioned at a first side of the casing in the axial direction;

a cover positioned at a second side of the casing in the axial direction, the cover having an opening;

an electrode electrically connected to a component of the developing cartridge, the electrode including:

a first electrical contact in contact with the component of the developing cartridge; and a side electrical contact surface facing outward in the axial direction, the side electrical contact surface being positioned at the second side of the casing in the axial direction, the side electrical contact surface being positioned farther from the component of the developing cartridge than the first electrical contact is from the component of the developing cartridge, the first electrical contact and the side electrical contact surface being electrically connected to the component of the developing cartridge; and a protrusion movable according to the rotation of the coupling, the protrusion being positioned at the second side of the casing, a distal end of the protrusion being positioned farther from the developing roller shaft than the side electrical contact surface is from the developing roller shaft, the distal end of the protrusion being exposed through the opening, wherein the side electrical contact surface is fully exposed.

2. The developing cartridge according to claim 1, wherein the electrode is fully exposed.

3. The developing cartridge according to claim 1,
wherein a first distance between the distal end of the protrusion and the side electrical contact surface is greater than a second distance between the first electrical contact and the side electrical contact surface.

4. The developing cartridge according to claim 1, further comprising a gear rotatable about a rotational axis extending in the axial direction, the gear being positioned at the second side of the casing in the axial direction,
wherein the protrusion extends in a radial direction of the gear.

5. The developing cartridge according to claim 4,
wherein the protrusion protrudes from the gear.

6. The developing cartridge according to claim 4,
wherein the protrusion extends radially outward in the radial direction of the gear.

7. The developing cartridge according to claim 1,
wherein the electrode is positioned at the second side of the casing in the axial direction.

8. The developing cartridge according to claim 1,
wherein the protrusion is movably supported by the cover.

9. The developing cartridge according to claim 1,
wherein the cover is fixed to the casing by a screw.

10. The developing cartridge according to claim 1,
wherein the component of the developing cartridge is the developing roller shaft.

11. The developing cartridge according to claim 1,
wherein the side electrical contact surface is closer to the developing roller shaft than the cover is to the developing roller shaft.

12. The developing cartridge according to claim 11,
wherein the cover includes a wall extending in the axial direction, the wall is positioned between the protrusion and the side electrical contact surface in a first direction crossing the axial direction, and the side electrical contact surface is not exposed through the opening.

* * * * *